US012519926B2

(12) United States Patent
Pyeoun (10) Patent No.: US 12,519,926 B2
(45) Date of Patent: Jan. 6, 2026

(54) IMAGE SENSOR AND METHOD OF DETECTING DEFECTIVE PIXELS

(71) Applicant: SK hynix Inc., Icheon-si (KR)

(72) Inventor: Chang Hee Pyeoun, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 103 days.

(21) Appl. No.: 18/408,972

(22) Filed: Jan. 10, 2024

(65) Prior Publication Data

US 2025/0055973 A1 Feb. 13, 2025

(30) Foreign Application Priority Data

Aug. 7, 2023 (KR) .......................... 10-2023-0102807

(51) Int. Cl.
*H04N 17/02* (2006.01)
*G06T 7/00* (2017.01)
*G06T 7/90* (2017.01)
*H04N 17/00* (2006.01)
*H04N 23/81* (2023.01)

(52) U.S. Cl.
CPC .......... *H04N 17/002* (2013.01); *G06T 7/001* (2013.01); *G06T 7/90* (2017.01); *H04N 23/81* (2023.01); *G06T 2207/10024* (2013.01); *G06T 2207/30108* (2013.01); *G06T 2207/30168* (2013.01)

(58) Field of Classification Search
CPC ...... H04N 17/02; H04N 17/002; H04N 23/81; G06T 7/90; G06T 7/001; G06T 2207/10024; G06T 2207/30108; G06T 2207/30168
USPC ......................................................... 348/133
See application file for complete search history.

(56) References Cited

U.S. PATENT DOCUMENTS

| 7,511,748 | B2* | 3/2009 | Kagle | H04N 25/68 |
| | | | | 348/246 |
| 8,035,704 | B2* | 10/2011 | Hu | H04N 9/646 |
| | | | | 348/246 |
| 8,571,346 | B2* | 10/2013 | Lin | H04N 25/683 |
| | | | | 348/241 |
| 10,868,985 | B2 | 12/2020 | Lin et al. | |
| 2024/0029423 | A1* | 1/2024 | Lin | G06V 10/993 |
| 2024/0311972 | A1* | 9/2024 | Huang | G06T 5/50 |

FOREIGN PATENT DOCUMENTS

KR 1020150135696 A 12/2015

* cited by examiner

*Primary Examiner* — Trang U Tran
(74) *Attorney, Agent, or Firm* — WILLIAM PARK AND ASSOCIATES LTD.

(57) ABSTRACT

An image sensor includes a pixel array including pixels and a controller configured to control the pixels to produce a plurality of images. The image sensor also includes a defect detector configured to determine a target image based on an average green pixel value and a gain value related to a light exposure time among the images, and detect an adaptive static defective pixel, which is a defective pixel with a fixed location based on pixel values included in the target image.

18 Claims, 5 Drawing Sheets

IMAGE SENSOR AND METHOD OF DETECTING DEFECTIVE PIXELS

CROSS-REFERENCE TO RELATED APPLICATION

The present application claims priority under 35 U.S.C. § 119 (a) to Korean patent application number 10-2023-0102807 filed on Aug. 7, 2023, in the Korean Intellectual Property Office, the entire disclosure of which is incorporated by reference herein.

BACKGROUND

1. Technical Field

Various embodiments of the present disclosure generally relate to image sensors, and more particularly, to an image sensor and method of detecting a defective pixel.

2. Related Art

Image sensors may be generally classified as charge coupled device (CCD) image sensors or complementary metal oxide semiconductor (CMOS) image sensors. The CMOS image sensor being inexpensive to manufacture, having low power consumption, and being easily integrated with peripheral circuits are receiving attention these days.

A wafer test may detect a defective pixel included in a manufactured image sensor. The defective pixel may refer to a pixel differing in pixel value by a preset value or more from neighboring pixels among pixels included in the image sensor.

The defective pixel may be included in the image sensor for various reasons in the manufacturing procedure, and may occur even after the wafer test due to a pixel failure or deterioration. When the image sensor includes information about the defective pixel, it may enhance accuracy of image data produced from the image sensor.

SUMMARY

In accordance with an embodiment of the present disclosure, an image sensor may include a pixel array including a plurality of pixels and a controller configured to control the pixels to produce a plurality of images. The image sensor may also include a defect detector configured to determine at least one target image based on an average green pixel value and a gain value related to a light exposure time among the images, and detect an adaptive static defective pixel, which is a defective pixel in a fixed location based on pixel values included in the target image.

A method in accordance with an embodiment of the present disclosure may include: producing a plurality of images; determining a target image based on an average green pixel value and a gain value related to a light exposure time among the images; and detecting an adaptive static defective pixel, which is a defective pixel in a fixed location, based on pixel values included in the target image.

In accordance with an embodiment of the present disclosure, an image sensor may include a pixel array including pixels and a controller configured to control the pixels to produce a plurality of images. The image sensor may also include a defect detector configured to determine a target image which satisfies a preset test condition based on an average pixel value and a gain value determined based on a light exposure time among the images, and detect an adaptive static defective pixel, which is a defective pixel with a fixed location, based on pixel values included in the target image.

In accordance with an embodiment of the present disclosure, an image sensor may include a pixel array including a plurality of pixels configured to output a plurality of images for a set frame. The image sensor may also include a defect detector configured to determine at least one target image among the plurality of images, to detect at least one pixel in which a defect occurs more than a set number of times in a fixed location among the plurality of pixels of the target image as an adaptive static defect pixel, and to correct the adaptive static defect pixel based on pixel values of neighboring pixels of the adaptive static defect pixel. The target image is determined based on at least one of an average output signal of the plurality of pixels, an analog gain for determining a magnitude of output signals of the plurality of pixels, and a light reception time of the pixel array.

DETAILED DESCRIPTION

Throughout the specification, certain structural or functional descriptions are merely provided for the purpose of explaining embodiments of the present disclosure, which may be put in practice in various forms, and should not be construed as being limited to the embodiments of the present disclosure.

Some embodiments of the present disclosure will now be described with reference to accompanying drawings to describe technical ideas of the present disclosure for those of ordinary skill in the art to put them into practice.

Some embodiments of the present disclosure are directed to an image sensor and method of detecting a defective pixel, by which a static defective pixel in a fixed location may be adaptively detected.

Figure 1:
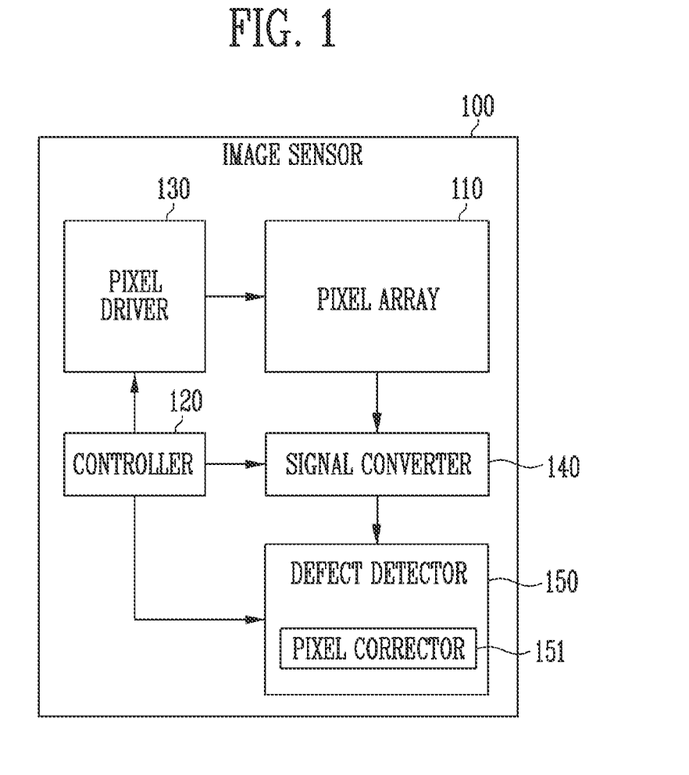
FIG. 1 is a diagram illustrating an image sensor according to an embodiment of the present disclosure.

FIG. 1 is a diagram illustrating an image sensor according to an embodiment of the present disclosure.

Referring to FIG. 1, an image sensor 100 may include a pixel array 110, a controller 120, a pixel driver 130, a signal converter 140, and a defect detector 150. The image sensor 100 may produce image data based on a received optical signal, and send the image data to an image signal processor for performing an operation of enhancing image quality.

The pixel array 110 may include a plurality of pixels arranged in the form of an array in rows and columns. Each of the pixels may include a micro-lens that concentrates light, a color filter determined based on a pattern type, and a photoelectric element that converts an optical signal to an electric signal. For example, the electric signals generated from the pixels may be analog signals. The analog signal may be adjusted in magnitude based on an analog gain value. As the analog gain value increases, the magnitude of the analog signal may increase. As the magnitude of the analog signal increases, a percentage of noise included in the signal may increase. The pixel array 110 may send the analog electric signal to the signal converter 140.

The controller 120 may control general operations of the image sensor 100. The controller 120 may generate control signals to control operation timing of the image sensor 100 or adjust the analog gain value through the pixel driver 130. The controller 120 may generate control signals to control operation of the signal converter 140. The controller 120 may generate and apply a clock signal or ramp signal to the signal converter 140. The controller 120 may generate control signals to control detection and correction operations of the defect detector 150.

The pixel driver 130 may output control signals for controlling the pixels of the pixel array 110. The pixels may produce the electric signals with an analog type (hereinafter, analog electric signal) in response to the control signals generated from the pixel driver 130.

The signal converter 140 may convert the electric signal output from the pixel array 110 to a digital signal. The signal converter 140 may perform a correlated double sampling to cancel noise included in the analog electric signal. The signal converter 140 may generate the digital signal by comparing the ramp signal with the analog electric signal. In an embodiment of the present disclosure, the digital signal may be referred to as image data. For example, the image data may include pixel values corresponding to the respective pixels. For instance, the pixel values may be an output signal of each of the pixels. Further, the out signal of the pixel driver 130 may include the analog type. A magnitude of the output signal of the pixel driver 130 may be determined based on an analog gain value. Output signals of the signal converter 140 may include the digital type. The image data may be sent to the defect detector 150.

In an embodiment of the present disclosure, the controller 120 may control the pixel array 110, the pixel driver 130, the signal converter 140, etc., for the image sensor 100 to produce a plurality of images. Each of the plurality of images may be produced based on image data corresponding to a single frame. For example, when a frame rate of the image sensor 100 is 60 frames per second (fps), the image sensor 100 may produce and output 60 images per second.

The defect detector 150 may adaptively detect at least one static defective pixel in at least one fixed location after a wafer test. In an embodiment of the present disclosure, the wafer test may refer to a test for detecting defects of the image sensor 100 in a manufacturing process. For example, defective pixels may be detected by comparing a test image produced by performing an image sensing operation in a preset condition with an ideal image corresponding to the preset condition. Defective pixels produced in the manufacturing process may be detected through the wafer test. Based on results of the detection operation performed multiple times, the defective pixels detected at the same locations on the pixel array 110 may be static defective pixels.

As described above, the static defective pixels in the fixed locations may be detected in the wafer test of the image sensor 100. In an embodiment of the present disclosure, after the wafer test, the image sensor 100 may further detect an adaptive static defective pixel based on a sensing result of the image sensor 100. In other words, during the operation of the image sensor 100, a pixel in which the defects are continuously found at the same location may be referred to as an adaptive static defective pixel. Adaptive static defective pixels are in addition to the static defective pixels detected as part of the manufacturing process during the wafer test. The defect detector 150 may receive, from the signal converter 140, image data corresponding to each of the plurality of images produced from the image sensor 100. The defect detector 150 may determine an image among the plurality of images produced from the image sensor 100, which is similar to a test image generated at the time of the wafer test, to be a target image. The defect detector 150 may determine at least one target image to be used to detect a static defective pixel even without performing an additional test after the wafer test.

The defect detector 150 may determine a plurality of target images among the plurality of images. The defect detector 150 may detect at least one defective pixel from each of the target images. Further, the defect detector 150 may determine adaptive static defective pixels by excluding the static defective pixels detected in the wafer test from among the pixels detected as being defective at least preset number of times at the same locations. The defect detector 150 may store information about the detected adaptive static defective pixels in memory. For example, the memory that stores the information about the adaptive static defective pixels may be read-only memory (ROM). The defect detector 150 may send a trigger signal to the controller 120 to store the information about the adaptive static defective pixels in response to detection of the adaptive static defective pixels. The trigger signal may be sent to the controller 120 according to an interrupt signal. When the controller 120 receives the trigger signal, the controller 120 may generate a control signal to control location information of the defective pixel detected by the defect detector 150 and information indicating whether the defective pixel is an adaptive static defective pixel to be stored in the memory.

The image sensor 100 may produce a plurality of images. Each of the plurality of images may be image data corresponding to a single frame. The plurality of images produced by the image sensor 100 may be successive images. Target images determined by the defect detector 150 might not be consecutive.

The information about the static defective pixel detected by the wafer test may also be stored in the memory. In an embodiment of the present disclosure, a static defective pixel detected not by the wafer test but based on a result of the sensing operation of the image sensor 100 may be referred to as the adaptive static defective pixel. The information about the static defective pixel detected by the wafer test may have already been stored in the memory. The defect detector 150 may include a pixel corrector 151 for correcting a pixel value of a defective pixel based on the information stored in the memory.

The pixel corrector 151 may correct the pixel value of the defective pixel by using neighboring pixel values of the defective pixel. How to correct the pixel value of the defective pixel by using the neighboring pixel values are already known to the public, so the detailed description will be omitted.

Figure 2:
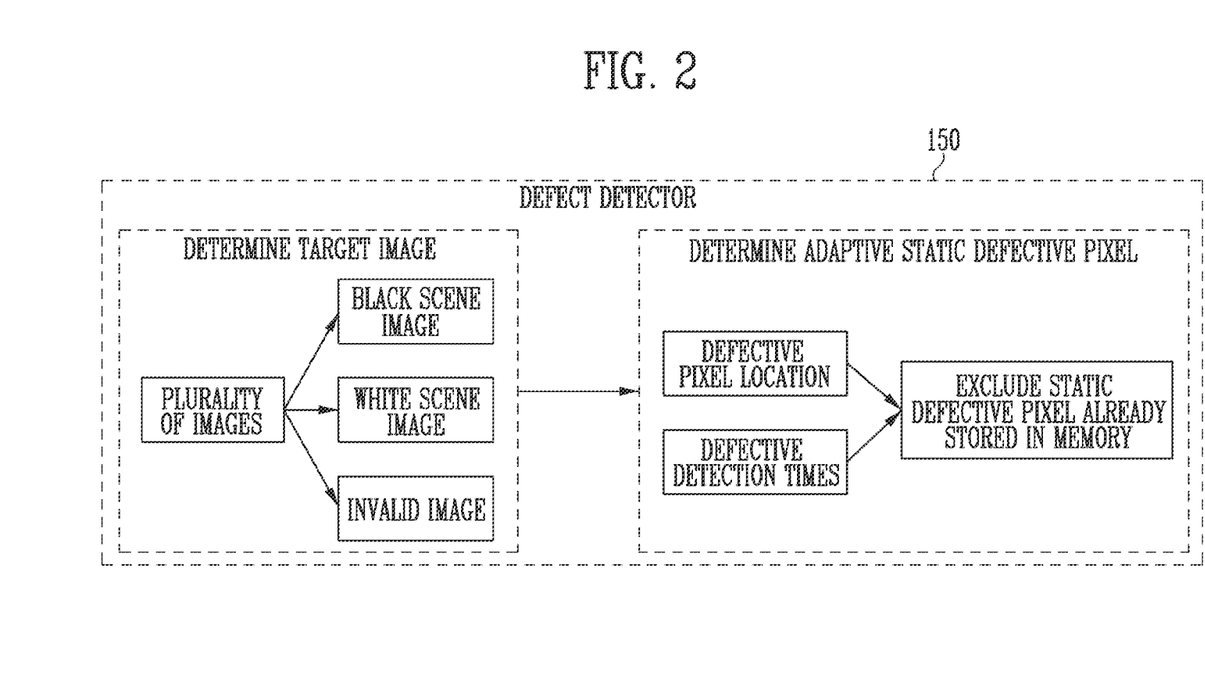
FIG. 2 is a diagram illustrating a defective pixel detection operation performed by a defect detector according to an embodiment of the present disclosure.

FIG. 2 is a diagram illustrating a defective pixel detection operation of a defect detector according to an embodiment of the present disclosure.

Referring to FIG. 2, the defect detector 150 may adaptively detect a static defective pixel in a fixed location even after the wafer test, and correct the detected defective pixel. In other words, the image sensor 100 including the defect detector 150 may adaptively detect a static defective pixel.

The image sensor 100 may produce a plurality of images. The defect detector 150 may determine a target image used for detecting an adaptive static defective pixel among the produced plurality of images. The defect detector 150 may determine the target image based on an average pixel value of pixels included in an image, an analog gain value to adjust the magnitude of the pixel value and a light reception time for image generation. In an embodiment of the present disclosure, the defect detector 150 may determine the target image based on an average green pixel value, an analog gain value of the image sensor 100, and a light reception time indicating a time for which the image sensor 100 is exposed to light. In another embodiment of the present disclosure, an average pixel value of another color pixel apart from the green pixel may be used in determining the target image. The average green pixel value may refer to an average pixel value of green pixels among the pixels included in the image.

The defect detector 150 may determine a black scene image or a white scene image similar to an image produced during the wafer test among the images generated after the wafer test to be the target image. The image sensor 100 may produce a test image that satisfies a preset condition during the wafer test. The black scene image may be an image corresponding to the test image produced under a dark condition of the wafer test. In the black scene image, a pixel having a difference in pixel value from neighboring pixels larger than a preset threshold may be a defective pixel. Similarly, the white scene image may be an image corresponding to the test image produced under a bright condition of the wafer test. The dark condition and the bright condition may be changed depending on the wafer test.

In an embodiment of the present disclosure, the defect detector 150 may determine the target image to be an image having an average green pixel value less than a first threshold among images produced when the analog gain value of the image sensor 100 exceeds a first reference value and the light reception time of the image sensor 100 exceeds a first time. The determined target image may correspond to the black scene image. The first reference image and the first time may be set to correspond to the dark condition of the wafer test. The average green pixel value may indicate brightness of the produced image. The first threshold may correspond to a brightness reference of the dark condition of the wafer test. When the average green pixel value of the produced image is equal to or larger than the first threshold, it may indicate that the produced image is not an image corresponding to the black scene image.

The defect detector 150 may determine the target image to be an image having an average green pixel value exceeding a second threshold among images produced when the analog gain value of the image sensor 100 is less than a second reference value and the light reception time of the image sensor 100 is less than the first time. The determined target image may correspond to the white scene image. The second threshold may correspond to a brightness reference of the bright condition of the wafer test. The second reference image and the second time may be set to correspond to the bright condition of the wafer test. The defect detector 150 may exclude, from the target image, a saturated image having an average green pixel value exceeding a third threshold even if the image is produced when the analog gain value of the image sensor 100 is less than the second reference value and the light reception time of the image sensor 100 is less than the first time. The third threshold, a criterion for determining the saturated image is larger than the second threshold.

In an embodiment of the present disclosure, the first reference value may be larger than the second reference value, and the first time may be longer than the second time. The analog gain value and the light reception time of the image sensor 100 may indicate validity of the target image. For example, even if an image produced when the analog gain value of the image sensor 100 is less than or equal to the first reference value and the light reception time of the image sensor 100 is less than or equal to the first time has an average green pixel value of the produced image less than the first threshold, the produced image might not be determined as the target image. As the magnitude of the pixel signal or the light reception time is not large or long enough, the produced image might not be used for detecting defective pixels. Likewise, even when the analog gain value of the image sensor 100 exceeds the second reference value or the light reception time of the image sensor 100 exceeds the second time, the produced image might not be determined as a valid image used to detect defective pixels.

In another embodiment of the present disclosure, the defective detector 150 may use an average pixel value of another color other than green or an average pixel value of the whole pixel regardless of any color.

The defect detector 150 may exclude an abnormal image that is out of vertical sync or horizontal sync from the target image. As the abnormal image that is out of vertical sync or horizontal sync is more likely to be an invalid image produced by a wrong operation, it may be excluded from the target image used for defect detection.

The defect detector 150 may detect defective pixels differing in pixel value by a preset value or more from neighboring pixels among the pixels included in the target image, and count the number of times of detecting defective pixels during a period in which a plurality of images are produced. The defect detector 150 may count how many times each pixel location is detected as the defective pixel. For example, the defect detector 150 may count the number of defective pixels by locations of the pixel array 110. The pixel location may be determined using a vertical sync or horizontal sync signal. How to determine the pixel location based on the vertical sync or horizontal sync signal is already known to the public, so the detailed description will be omitted.

The defect detector 150 may determine a sufficient number of target images among the plurality of images to determine adaptive static defective pixels. The defect detector 150 may repeat the target image determination operation until there are a sufficient number of target images to determine the adaptive static defective pixels.

For example, the image sensor 100 may produce 125 images, and the defect detector 150 may determine 60 of the 125 images as target images. In a case that a pixel detected as a defective pixel 100 times or more at the same location is determined as a static defective pixel, the defect detector 150 may determine additional target images among images newly produced by the image sensor 100 until the defective pixel is detected 100 times at the same location.

The defect detector 150 may determine, among the defective pixels, a defective pixel detected a preset number of times or more at the same location as an adaptive static defective pixel that is a defective pixel in the fixed location. The defect detector 150 may exclude, from the adaptive static defective pixel, pixels detected as being defective due to e.g., a temporary error or a flicker phenomenon by determining the defective pixel detected a preset number of times or more as the adaptive static defective pixel.

The defect detector 150 may exclude, from the adaptive static defective pixel, defective pixels at the same locations as the static defective pixels stored in the memory among the detected defective pixels. In an embodiment of the present disclosure, the memory that stores information about the static defective pixels may be ROM. In the ROM, information about static defective pixels detected as defective pixels in the fixed locations in the wafer test may be stored in advance. The defect detector 150 may distinguish between already-detected static defective pixels and adaptive static defective pixels detected after the wafer test, based on the information stored in the ROM. The defect detector 150 may perform an operation of sorting the static defective pixels and adaptive static defective pixels. The defect detector 150 may determine that defective pixels corresponding to the static defective pixels already stored in the ROM among the defective pixels detected through the detection operation of the present disclosure are not adaptive static defective pixels.

The defect detector 150 may store information about the adaptive static defective pixels in the memory. In an embodiment of the present disclosure, the memory that stores the information about the adaptive static defective pixels may be ROM. The controller 120 may send a control signal to the ROM to store the information about the adaptive static defective pixel in the ROM. In the ROM, information about static defective pixels detected in the wafer test and adaptive static defective pixels detected after the wafer test may be stored. The technology to store the information in the ROM is already known to the public, so the detailed description will be omitted from the specification.

Figure 3:
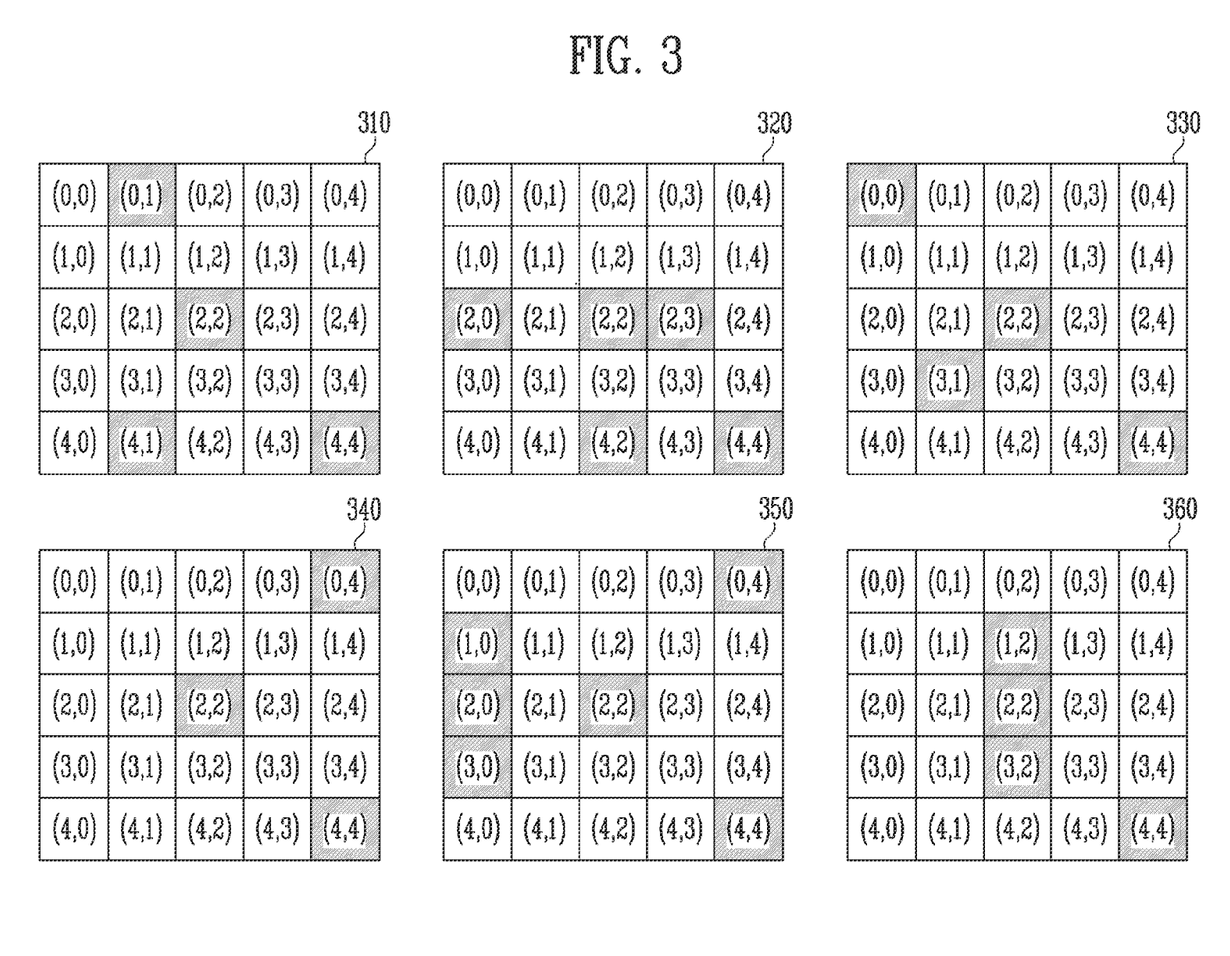
FIG. 3 is a diagram illustrating adaptive static defective pixels included in a target image.

FIG. 3 is a diagram illustrating adaptive static defective pixels included in a target image.

Referring to FIG. 3, illustrated are target images 310 to 360 each in size 5*5. Pixels represented with shadow in the target images 310 to 360 may indicate pixels detected as defective pixels. It may be assumed in FIG. 3 that a pixel detected as being defective at least 6 times at the same location may be determined as an adaptive static defective pixel.

Pixels (0,1), (2,2), (4,1) and (4,4) are shown to be detected as defective pixels in the first target image 310. Pixels (2,0), (2,2), (2,3), (4,2) and (4,4) are shown to be detected as defective pixels in the second target image 320. Pixels (0,0), (2,2), (3,1) and (4,4) are shown to be detected as defective pixels in the third target image 330. Pixels (0,4), (2,2) and (4,4) are shown to be detected as defective pixels in the fourth target image 340. Pixels (0,4), (1,0), (2,0), (2,2), (3,0) and (4,4) are shown to be detected as defective pixels in the fifth target image 350. Pixels (1,2), (2,2), (3,2) and (4,4) are shown to be detected as defective pixels in the sixth target image 360.

Locations at which pixels are detected as being defective at least 6 times are (2,2) and (4,4) in the target images 310 to 360. All the pixels except for the pixels at locations (2,2) and (4,4) might not be defective pixels or may be temporarily defective pixels. The defect detector 150 may store information about only static defective pixels in the fixed locations in a memory. In an embodiment of the present disclosure, the memory that stores information about the static defective pixels may be ROM.

It may be assumed that the pixel at location (4,4) is stored in the ROM as a static defective pixel detected in the wafer test. The defect detector 150 may determine only the pixel at location (2,2) as an adaptive static defective pixel by excluding the pixel at location (4,4) from the adaptive static defective pixel. The defect detector 150 may store information about the pixel at location (2,2) in memory. In an embodiment of the present disclosure, the memory that stores the information about the adaptive static defective pixels may be ROM.

Figure 4:
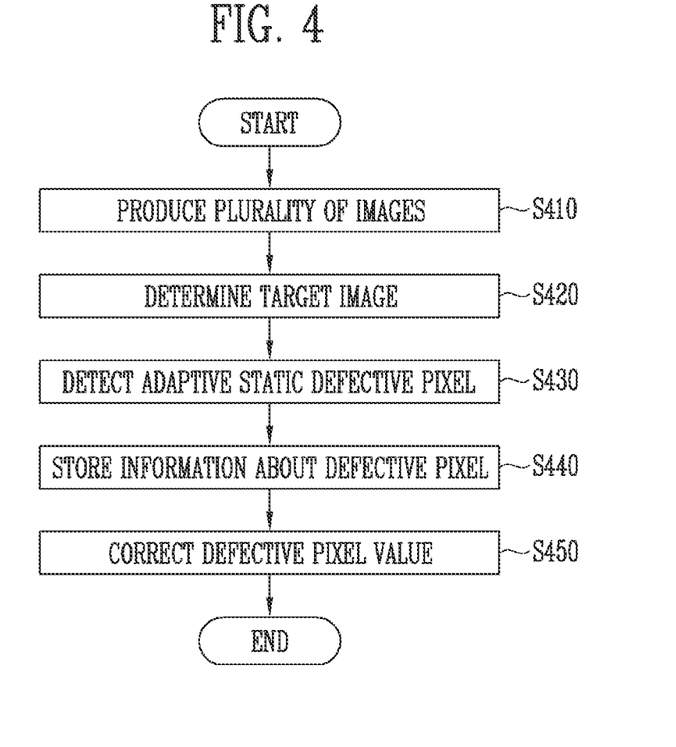
FIG. 4 is a flowchart for describing a defective pixel detection operation of an image sensor according to an embodiment of the present disclosure.

FIG. 4 is a flowchart for describing a defective pixel detection operation of an image sensor according to an embodiment of the present disclosure.

Referring to FIGS. 1 to 4, the image sensor 100 may adaptively detect a static defective pixel and store it in a memory even after the wafer test. An adaptive static defective pixel may refer to a defective pixel in the fixed location detected after the wafer test. The image sensor 100 may correct a pixel value of the defective pixel stored in the memory. In an embodiment of the present disclosure, the memory that stores information about the static defective pixel and the adaptive static defective pixel may be a ROM.

At step S140, the image sensor may generate a plurality of images. Each of the plurality of images may be image data corresponding to a single frame. The plurality of images may be sent to the defect detector 150.

At step S420, the defect detector 150 may determine at least one target image among the plurality of images based on an average pixel value, an analog gain value, and a light reception time. The defect detector 150 may determine the target image by using an average green pixel value or an average pixel value. The analog gain value and the light reception time may indicate whether the target image is a valid image to be used for detecting defective pixels. The defect detector 150 may determine a black scene image to be an image having an average pixel value less than the first threshold among images produced when the analog gain value of the image sensor exceeds the first reference value and the light reception time of the image sensor exceeds the first time. Similarly, the defect detector 150 may determine a white scene image to be an image having an average pixel value exceeding the second threshold among images produced when the analog gain value of the image sensor is less than the second reference value and the light reception time of the image sensor is less than the second time. The defect detector 150 may determine the black scene image and the white scene image as target images to be used for detecting defective pixels. The defect detector 150 may exclude an abnormal image that is out of vertical sync or horizontal sync from the target image to enhance accuracy of the detection operation. The defect detector 150 may determine a sufficient number of target images to determine adaptive static defective pixels.

At step S430, the defect detector 150 may detect adaptive static defective pixels among the pixels included in the target image. The defect detector 150 may detect defective pixels having a pixel value different from neighboring pixel values by at least a preset value among the pixels included in the target image, and count the number of times of detecting defective pixels during a period in which a plurality of images are produced. The defect detector 150 may count the number of times of detecting the defective pixel at each location. The defect detector 150 may determine a pixel detected as the defective pixel at least a certain number of times at the same location as an adaptive static defective pixel. The defect detector 150 may exclude a pixel identical to the pixel already stored in the memory as the static defective pixel among pixels each detected as a defective pixel at least the certain number of times at the same location from the adaptive static defective pixel. For example, a defective pixel already identified as a static defective pixel during the wafer test is not also identified as an adaptive static defective pixel by the defect detector 150.

At step S440, the defect detector 150 may store information about the detected adaptive static defective pixel in the memory. The defect detector 150 may send a trigger signal to the controller in response to detecting the adaptive static defective pixel. The controller 120 may generate a control signal to store the information about the adaptive static defective pixel in the memory. On receiving the control signal, the defect detector 150 may store location information of the adaptive static defective pixel and index information indicating an adaptive static defective pixel additionally detected based on images produced from the defective pixel by an image sensing operation after the wafer test.

At step S450, the pixel corrector may correct the pixel value of a defective pixel based on information stored in the memory. The pixel corrector may correct a defective pixel value by using pixel values of neighboring pixels of the defective pixel.

Figure 5:
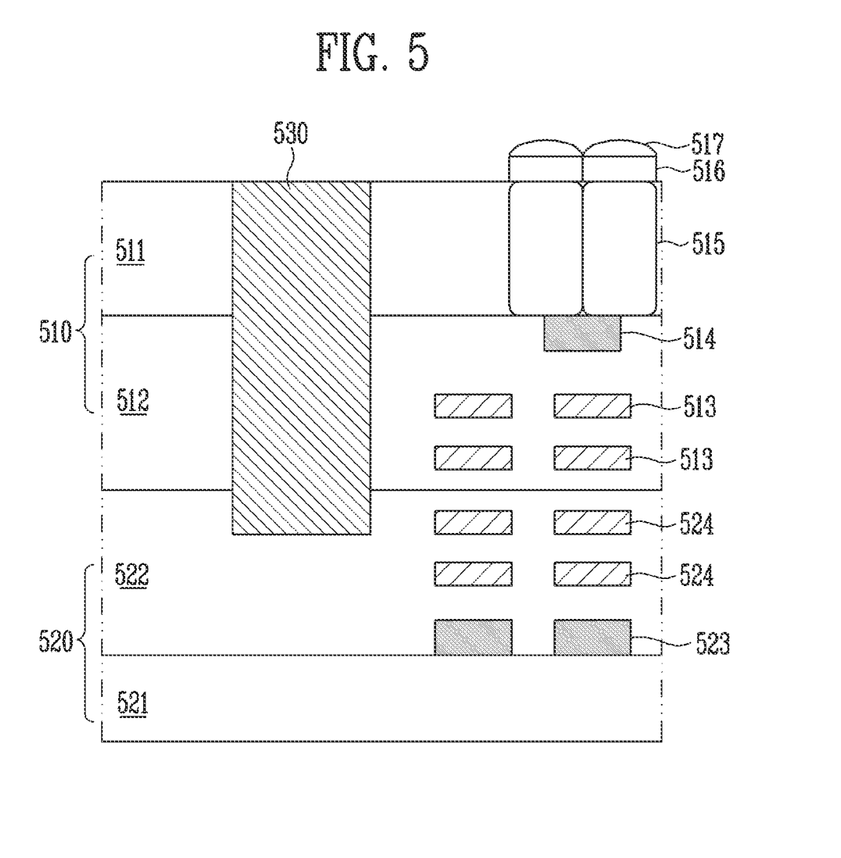
FIG. 5 is a diagram illustrating a stacked image sensor according to an embodiment of the present disclosure.

FIG. 5 is a diagram illustrating a stacked image sensor according to an embodiment of the present disclosure.

Referring to FIG. 5, a cross-sectional view of the image sensor having a stacked structure of an upper element 510 and a lower element 520 connected through a through silicon via 530 is illustrated. The upper element 510 may include an upper substrate 511 and an upper interlayer insulating layer 512. The lower element 520 may include a lower substrate 521 and a lower interlayer insulating layer 522. The upper element 510 may be stacked on the lower element 520 so that active surfaces of the upper element 510 and the lower element 520 face each other. The active surface may refer to a side on which a gate 514 or 523 is formed.

The upper substrate 511 may include a photo diode 515. A color filter 516 and a micro-lens 517 may be formed on the top of the photo diode 515. The color filter 516 and the micro-lens 517 may each include organic matters. The upper substrate 511 may include a silicon wafer and the other semiconductor substrate. In an embodiment of the present disclosure, the upper substrate 511 may be called a device substrate.

The upper interlayer insulating layer 512 may have a form that encloses a transfer gate 514 and upper metal lines 513. The upper interlayer insulating layer 512 may include at least one of a silicon oxide, a silicon nitride, or a silicon oxynitride. The transfer gate 514 may be arranged to partially overlap the photo diode 515. The transfer gate 514 may transfer electrons produced from the photo diode 515 to a floating diffusion region.

The lower substrate 521 may include a silicon wafer. Logic gates 523 may be formed on the lower substrate 521. The logic gates 523 may be electronic circuits implemented with digital circuits that perform firmware or a certain algorithm to perform a certain operation.

The lower interlayer insulating layer 522 may have a form that encloses the logic gates 523 and lower metal lines 524. Like the upper interlayer insulating layer 512, the lower interlayer insulating layer 522 may include at least one of a silicon oxide, a silicon nitride, or a silicon oxynitride. The lower metal lines 524 and the upper metal lines 513 may deliver various electric signals and include metal or conductors.

The through silicon via 530 may penetrate through the upper substrate 511 and the upper interlayer insulating layer 512, and partially penetrate the lower interlayer insulating layer 522. The through silicon via 530 may include a barrier layer on its surface. The through silicon via 530 may be electrically connected to the upper metal lines 513, the transfer gate 514, the logic gates 523, and the lower metal lines 524.

Referring to FIG. 5 with FIG. 1, the pixel array 110 may be included in the upper substrate 511, and all of the controller 120, the pixel driver 130, the signal converter 140, and the defect detector 150 except for the pixel array 110 may be implemented with the lower substrate 521 and the logic gates 523. The defect detector 150 may determine target images among the images produced by a sensing operation of the image sensor based on brightness levels and validity. The defect detector 150 may detect an image that meets the bright condition or dark condition among the images, based on an average pixel value of the pixels. The defect detector 150 may determine whether one of the images is valid to be used for detecting a defective pixel based on a light reception gain value. The defect detector 150 may perform a defective pixel detection operation on the target images. The defect detector 150 may detect adaptive static defective pixels newly produced by the use of the image sensor, among the defective pixels each detected at least a preset number of times at the same location on the pixel array 110. The controller 120 may generate a control signal to store information about an adaptive static defective pixel in a ROM in response to detection of the adaptive static defective pixel, and the defect detector 150 may store the information about the adaptive static defective pixel in the ROM in response to reception of the control signal.

The stack structure of the image sensor may be a structure to satisfy the performance required for the image sensor. In a case that an area of the image sensor is restricted, the stack structure may allow a space for the circuits that perform operations required for the image sensor to be secured while allowing an area of the pixel array to be secured as much as possible. With the stack structure, electronic circuits that perform a more advanced function than before may be included in the image sensor.

The stacked image sensor may perform part of an image processing operation within the image sensor itself to improve quality of the generated image data. As the defect detector 150 is implemented with the lower substrate 521 and the logic gates 523, the defect detection operation may be performed more quickly than performed in the image signal processor. Also, as part of the image processing operation is performed by the image sensor, the image signal processor may perform the image processing operation with better performance. As a result, quality of an output image may be improved.

While the present disclosure has been shown and described with reference to certain embodiments thereof, it will be understood by those skilled in the art that various changes in form and detail may be made therein without departing from the spirit and scope of the present disclosure as defined by the appended claims and their equivalents.

What is claimed is:

1. An image sensor comprising:
   a pixel array including a plurality of pixels;
   a controller configured to control the pixels to generate a plurality of images; and
   a defect detector configured to determine at least one target image among the plurality of images based on an average green pixel value, an analog gain value to adjust a magnitude of a pixel signal, and a light reception time indicating a light exposure time, and detect an adaptive static defective pixel, which is a defective pixel in a fixed location based on pixel values included in the at least one target image.

2. The image sensor according to claim 1, wherein the defect detector is configured to determine the at least one target image to be a black scene image having the average green pixel value less than a first threshold among the plurality of images generated when the analog gain value of the image sensor exceeds a first reference value and the light reception time of the pixel array exceeds a first time.

3. The image sensor according to claim 1, wherein the defect detector is configured to determine the at least one target image to be a white scene image having the average green pixel value exceeding a second threshold among the plurality of images generated when the analog gain value of the image sensor is less than a second reference value and the light reception time of the pixel array is less than a second time.

4. The image sensor according to claim 3, wherein:
the defect detector is configured to exclude a saturated image having the average green pixel value exceeding a preset third threshold from the at least one target image, and
the preset third threshold is larger than the second threshold.

5. The image sensor according to claim 1, wherein the defect detector is configured to exclude an abnormal image out of vertical sync or horizontal sync from the at least one target image.

6. The image sensor according to claim 1, wherein the defect detector is configured to:
detect defective pixels differing in pixel value by a preset value or more from neighboring pixels among pixels included in the at least one target image;
count a number of times of detecting the defective pixels during a period in which the plurality of images are produced;
and determine, among the defective pixels, a defective pixel detected at least a preset number of times at an identical location to be the adaptive static defective pixel.

7. The image sensor according to claim 6, wherein the defect detector is configured to exclude, among the defective pixels, defective pixels at locations identical to those of static defective pixels stored in memory from the adaptive static defective pixel.

8. The image sensor according to claim 7, wherein the static defective pixels are detected to be defective pixels in fixed locations in a wafer test.

9. The image sensor according to claim 7, wherein the defect detector is configured to store information about the adaptive static defective pixel in the memory.

10. The image sensor according to claim 9, further comprising:
a pixel corrector configured to correct defective pixels stored in the memory based on neighboring pixel values of the defective pixels.

11. A method of detecting a defective pixel in an image sensor, the method comprising:
producing a plurality of images;
determining a target image among the images based on a brightness level of the image, a light reception time indicating a time for which the image is exposed to light, and an analog gain value for adjusting a signal magnitude of the image;
detecting an adaptive static defective pixel, which is a defective pixel with a fixed location based on pixel values included in the target image;
generating a trigger signal to store information about the adaptive static defective pixel in response to detection of the adaptive static defective pixel; and
storing the information about the adaptive static defective pixel in memory in response to the trigger signal.

12. The method according to claim 11, wherein determining the target image comprises:

determining the target image to be an image having a brightness level lower than a first threshold corresponding to a dark condition or higher than a second threshold corresponding to a bright condition;
excluding, from the target image, a first invalid image having the light reception time and the analog gain value less than or equal to a first time and a first reference value indicating validity of the image corresponding to the dark condition; and
excluding, from the target image, a second invalid image having the light reception time and the analog gain value equal to or larger than a second time and a second reference value indicating validity of the image corresponding to the bright condition,
wherein the first time is larger than the second time, and the first reference value is larger than the second reference value.

13. The method according to claim 11, wherein detecting the adaptive static defective pixel comprises:
detecting defective pixels differing in pixel value by a preset value or more from neighboring pixels among pixels included in the target image;
counting a number of times of detecting the defective pixels during a period in which the plurality of images are produced; and
determining, among the defective pixels, a defective pixel detected at least a preset number of times at an identical location to be the adaptive static defective pixel.

14. The method according to claim 11, further comprising:
correcting defective pixels stored in the memory based on neighboring pixel values of the defective pixels.

15. An image sensor comprising:
a pixel array including pixels;
a controller configured to control the pixels to produce a plurality of images; and
a defect detector configured to determine a target image satisfying a preset test condition among the plurality of images based on an average pixel value, an analog gain value to adjust a magnitude of an analog pixel signal, and a light reception time indicating a light exposure time, and detect an adaptive static defective pixel, which is a defective pixel in a fixed location based on pixel values included in the target image.

16. The image sensor according to claim 15, wherein:
the test condition corresponds to a dark condition in which the analog gain value exceeds a first reference value and the light reception time exceeds a first time or a bright condition in which the analog gain value is less than a second reference value and the light reception time is less than a second time,
the first reference value is larger than the second reference value,
the first time is longer than the second time, and
the defect detector is configured to determine the target image to be an image having the average pixel value less than a first threshold corresponding to the dark condition or the average pixel value larger than a second threshold corresponding to the bright condition, wherein the average pixel value indicates a brightness level of a produced image.

17. The image sensor according to claim 16, wherein the defect detector is configured to exclude, from the target image, a saturated image having the average pixel value exceeding a saturation reference value indicating whether pixel values of the image are saturated.

18. The image sensor according to claim 15, wherein the defect detector is configured to count a number of times of detecting defective pixels differing in pixel value by a preset value or more from neighboring pixels among pixels included in the target image during a period in which the plurality of images are produced, and determine a defective pixel detected at least a preset number of times at an identical location to be the adaptive static defective pixel.

* * * * *